United States Patent
Ulriksen

(10) Patent No.: US 9,301,498 B2
(45) Date of Patent: Apr. 5, 2016

(54) SYSTEM FOR TREATMENT OF LICE, AND CORRESPONDING METHOD FOR TREATMENT OF LICE

(75) Inventor: Ulrik Ulriksen, Olsvik (NO)

(73) Assignee: OCEA AS, Bergen (NO)

( * ) Notice: Subject to any disclaimer, the term of this patent is extended or adjusted under 35 U.S.C. 154(b) by 104 days.

(21) Appl. No.: 14/113,622

(22) PCT Filed: Apr. 27, 2012

(86) PCT No.: PCT/NO2012/000038
§ 371 (c)(1),
(2), (4) Date: Dec. 11, 2013

(87) PCT Pub. No.: WO2012/148283
PCT Pub. Date: Nov. 1, 2012

(65) Prior Publication Data
US 2014/0174371 A1    Jun. 26, 2014

(30) Foreign Application Priority Data
Apr. 27, 2011 (NO) .................................. 20110625

(51) Int. Cl.
| A01K 61/00 | (2006.01) |
| A01K 13/00 | (2006.01) |
| A01K 63/00 | (2006.01) |

(52) U.S. Cl.
CPC ............. *A01K 13/001* (2013.01); *A01K 61/00* (2013.01); *A01K 61/001* (2013.01); *A01K 63/00* (2013.01)

(58) Field of Classification Search
USPC .................. 119/219, 226, 227, 231, 601, 602
See application file for complete search history.

(56) References Cited

U.S. PATENT DOCUMENTS

| 3,859,522 A | * | 1/1975 | Cuthbert ................... 250/223 R |
| 5,103,767 A | * | 4/1992 | Haugland et al. ............. 119/215 |
| 5,313,911 A | * | 5/1994 | Thomassen et al. .......... 119/231 |
| 5,762,024 A | * | 6/1998 | Meilahn ........................ 119/223 |
| 6,365,170 B1 | * | 4/2002 | Trevisan ....................... 424/406 |
| 2008/0202998 A1 | | 8/2008 | Tseng |

FOREIGN PATENT DOCUMENTS

| JP | 2008-011764 A | 1/2008 | |
| WO | WO 8808665 * | 5/1988 | ............. A01K 61/00 |
| WO | WO 9608138 A2 * | 3/1996 | ............. A01K 61/00 |
| WO | WO 9824304 A1 * | 6/1998 | ............. A01K 61/00 |
| WO | 99/41976 A2 | 8/1999 | |
| WO | 2005/124032 A1 | 12/2005 | |
| WO | 2010/087722 A1 | 8/2010 | |

OTHER PUBLICATIONS

International Search Report mailed Jul. 18, 2012; PCT/NO2012/000038.

* cited by examiner

*Primary Examiner* — Kristen C Hayes
*Assistant Examiner* — Ebony Evans
(74) *Attorney, Agent, or Firm* — Ladas & Parry LLP

(57) ABSTRACT

A lice treatment system for marine organisms, such as fish, is described where the system is a closed system comprising: an inlet (1) for fish that shall be treated, a first separator (2) to separate the fish and water and which is arranged after the inlet (1), a pipeline (6) for the transport of the fish, in which, at least, one part of the pipeline (6) constitutes a liquid bath (5) for the fish and which is arranged to receive the treatment liquid, a second separator (7) to separate the fish and the treatment liquid, an outlet (8) for the discharge of the treated fish and which is arranged after the second separator (7), and a circulation pump (10) for the circulation of the treatment liquid in the closed system. The part of the pipeline that constitutes the liquid bath (5) is formed in a U-shape so that a liquid bath with respective liquid surfaces (4) is formed.

17 Claims, 1 Drawing Sheet

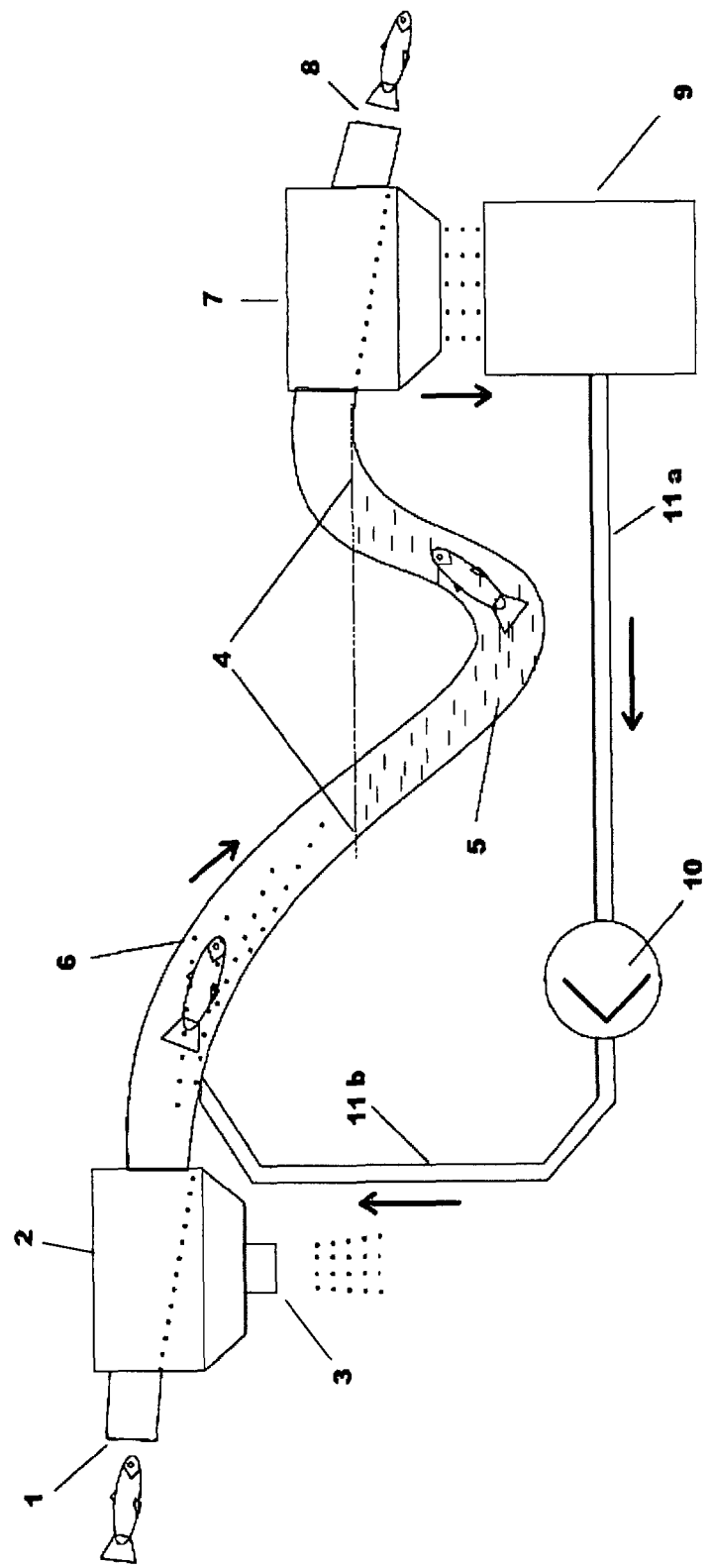

SYSTEM FOR TREATMENT OF LICE, AND CORRESPONDING METHOD FOR TREATMENT OF LICE

The present invention relates to a lice treatment system and method for marine organisms, such as fish, for the removal of lice as described in the introduction of the respective independent claims.

It is a known principle that lukewarm water makes lice quickly let go of the fish and that a short exposure time is sufficient to result in a very good delousing effect. The challenge is to treat large amounts of fish with this method. This method is not in commercial use today.

Today, known delousing methods are, among others, washing treatment in a net cage, where one closes the net cage with a tarpaulin, adds a treatment agent in the net cage and removes the tarpaulin afterwards. Another treatment form is to treat in a well boat. Then, one pumps the fish into the well, closes it and adds a treatment agent and lets this take effect. Afterwards, the fish and the treatment water are pumped out from the well. In this method the chemicals used are normally mixed with the water.

From prior art reference is made, among others, to WO 9941976 A2 which relates to an apparatus for the treatment of fish in a medicinal water bath that is recirculated and dosed with medical ingredients. A floating tank is used which is placed in a body of water from which the fish is collected and after treatment is sent back to. The liquid that follows the fish from the watery environment and from the liquid bath is separated from the fish.

WO 2010/087722 A1 relates to a mobile device for delousing of aquatic organisms, such as fish, in a floating net cage installation. The device comprises a partially submersible module that can be placed between two net cages. The module comprises a reservoir with at least one inlet channel and one outlet channel. The fish is transported through the reservoir with the help of, at least, one horizontally moveable grid that can be hoisted. Furthermore, the module comprises means for dosing the chosen delousing agent in a controlled way down into the reservoir and which is mixed with water so that lice are removed from the fish in the channel and lice are removed from the reservoir.

JP 2008011764 A shows a solution to fight fish lice by raising the temperature of the water where the fish is found.

With the present invention a system is provided where the fish is treated while it is moved from one unit to another. The fish is pumped continuously through the system and not in groups. The treatment water is a closed loop into which the fish is led, brought through and taken out of continuously.

Thus, it is an object of the present invention to provide a system and a method for simple and continuous lice treatment of fish.

Another object is to provide an energy saving solution.

The above mentioned objects are achieved with a system according to the invention, in that the system is a closed system comprising an inlet for fish that shall be treated; a first separator to separate the fish and water and which is arranged after the inlet; a pipeline for the transport of the fish, in which, at least, one part of the pipeline constitutes a liquid bath for the fish and which is arranged to receive the treatment liquid; a second separator to separate fish and the treatment liquid; an outlet for discharge of the treated fish and which is arranged after the second separator; and a circulation pump for the circulation of the treatment liquid in the closed system. The part of the pipeline which constitutes the liquid bath is formed in a U-shape so that a liquid bath with respective liquid surfaces is formed.

Alternative embodiments are given in the dependent system claims.

The treatment liquid can be lukewarm water with a temperature of about 30° C. Alternatively, or in addition, the treatment liquid can be water to which chemicals have been added.

Furthermore, the part of the pipeline which constitutes the liquid bath can be formed in the shape of a spiral.

A container for the collection of the treatment liquid can be arranged downstream of the second separator and the container can be connected to the circulation pump via a line for the circulation of collected treatment liquid.

Furthermore, a line can run between the pipeline and the circulation pump and where the line preferably ends up in an area after the first separator.

After the first separator the pipeline can run at an angle and is directed downwards towards the liquid bath, whereby the fish is arranged to be transported in the pipeline due to its specific weight and/or a liquid flow of the treatment liquid supplied by the circulation pump. Thereby, the first separator can be arranged higher than a liquid surface of the liquid bath, and the second separator can be arranged lower than, or at approximately the same height as, the liquid surface in the liquid bath.

Correspondingly, the pipeline before the second separator can be tilted at an angle upwards from the liquid bath, whereby the fish is arranged to be transported in the pipeline due to a liquid flow of treatment liquid supplied by the circulation pump and by the stream of fish in through the inlet.

The container for the collection of the treatment liquid can comprise a heating element and/or be arranged to receive heated water. Furthermore, the container for the collection of the treatment liquid can comprise equipment for the separation and collection of separated lice.

The system can also comprise measuring devices and equipment to monitor the temperature of the treatment liquid and also the amount of liquid that circulates in the system.

The above mentioned object is also achieved by the method according to the invention, where the fish is brought through a liquid bath with treatment liquid comprising the steps: to feed continuously fish from the outside and in through an inlet for fish that is to be treated, whereupon the fish and the water are separated; to bring the fish through a closed liquid bath with a U-shape filled with a treatment liquid so that a liquid bath with respective liquid surfaces is formed for the removal of lice; to separate the treatment liquid from the fish before it is released out through an outlet; and that the treatment liquid is continuously pumped back and mixed with the fish that is fed in through the inlet.

Alternative embodiments are given in the dependent method claims.

The treatment liquid can preferably be lukewarm water with a temperature of about 30° C. and water which is separated can be caught in a container and be heated up to the desired temperature before it is pumped back.

The treatment liquid can alternatively be water to which chemicals for the lice treatment have been added and water which is separated can be caught in a container. To prevent discharges into the sea the chemicals can be separated from the collected water in the container.

The exposure time for the fish in the liquid bath is normally dependant on the height and volume of the liquid bath, and also the rate of flow. The exposure time for the fish in the liquid bath can be around 30 seconds.

The invention shall now be described in more detail with the help of the enclosed diagram; in which a system according to the present invention is shown.

As it can be seen the system comprises an inlet 1 through which the fish is fed. The fish that is fed in can come from anywhere, such as an adjoining net cage or fish carrier, or if the installation is used on land, from a tank with fish.

After the fish has passed the inlet 1, water and fish are separated in a first separator 2 so that the water is released through a lower outlet 3 and the fish is brought further through a pipeline 6. The pipeline 6 can be any closed channel that is arranged for the transport of the fish.

Thereafter, the fish is brought through the pipeline 6 and to a liquid bath 5 filled with a treatment liquid, such as lukewarm water. The water can preferably have a temperature of about 30° C., but other temperatures can also be used, such as, for example, a temperature of between 30 and 40° C., or even higher for that matter. The temperature can be held correspondingly lower if this is appropriate. Alternatively, or in addition, the treatment liquid can comprise water to which chemicals for lice treatment have been added, where the water can have the above mentioned temperatures or, for that matter, any other suitable temperatures. The chemicals are primarily considered to be the standard, known chemicals for treatment of lice.

The liquid bath 5 can be provided as a part of the pipeline 6 and where the pipeline can be formed with a U-form and/or spiral form so that a liquid bath is formed with respective liquid surfaces 4 that lie higher than a lower part of the liquid bath, i.e. a liquid surface that lies higher for incoming fish and a liquid surface that lies higher for outgoing fish than the liquid bath itself.

After the fish has passed the liquid bath 5 the treatment liquid is separated from the fish in a second separator 7 before the fish is brought out through the outlet 8. The fish that is brought out can be released into an adjoining net cage or a well boat, or if the installation is used on land, to a tank for fish. Thus, the present system can be placed between several of the described units for fish, or for that matter, in a unit containing fish.

The treatment liquid which is separated in the separator 7 is caught in a container or tank 9 placed downstream of the separator 7. The container 9 can comprise a heating element (not shown) for the heating of the treatment liquid to a desired temperature. Alternatively, heated water can be added so that the treatment liquid which shall circulate has the wanted temperature. One advantage with the closed system where the treatment liquid is pumped round is that it is only necessary to heat or supply a relative small amount of heated water, which will thereby result in an energy saving system.

For circulation of the treatment liquid a circulation pump 10 of a known type can be used and which in the closed system is placed between the tank 9 and the inlet. As the FIGURE shows, a line 11a runs from the tank 9 to the pump and a line 11b runs from the pump and to an area preferably beyond the separator 2. The pump 10 can, of course, be placed in a location other than the one shown.

When the system is operating the treatment liquid in the form of, for example, lukewarm water is pumped in the pipeline 6 and follows the fish to the liquid bath 5 where the fish is exposed further to the treatment liquid for, for example, 30 seconds. Thereafter, the fish is forced further through the pipeline 6 and out through the outlet 8. If required a delousing agent can be added to the treatment liquid to further clean the fish of lice. In the latter case, the water that is separated is caught in the container 9 and the chemicals are thereafter separated from the collected water in the container 9 to prevent any discharge into the sea.

Thereby, the fish is transported in the pipeline due to the liquid flow of the treatment liquid supplied by the circulation pump and by the stream of fish into the other end.

At the end of the treatment it can happen that some fish remain in the liquid bath. For this reason a hatch or the like is provided in the part of the pipeline that constitutes the liquid bath so that the fish can be taken out manually. Alternatively, a compressed air system (not shown) can be provided, which "blows" out the fish. A further alternative is that the pump supplies sufficient amounts of liquid so that the fish is flushed out.

The invention claimed is:

1. Lice treatment system for marine organisms, where the system is a closed system comprising:
   an inlet for marine organisms that shall be treated,
   a first separator for separating marine organisms and water, said first separator being placed after the inlet,
   a pipeline for transport of the marine organisms, in which at least one part of the pipeline constitutes a liquid bath for the marine organisms, and which is arranged to receive a treatment liquid,
   a second separator to separate the marine organisms and the treatment liquid,
   an outlet for discharge of treated marine organisms, said outlet being placed after the second separator, and
   a circulation pump for circulation of the treatment liquid in the closed system,
   wherein
   said at least one part of the pipeline, which constitutes the liquid bath, is formed in a U-shape to provide liquid bath with respective liquid surfaces, and
   a container for collection of the treatment liquid is placed downstream of the second separator, and the container is connected to said circulation pump via a line for recirculation of the collected treatment liquid.

2. Treatment system according to claim 1, wherein the treatment liquid is lukewarm water with a temperature of about 30° C.

3. Treatment system according to claim 1, wherein the treatment liquid is water to which chemicals are added.

4. Treatment system according to claim 1, wherein a line runs between the pipeline and the circulation pump, and where the line ends up in an area after the first separator.

5. Treatment system according to claim 4, wherein the pipeline, after the first separator, is tilted at an angle and directed downwards toward the liquid bath, whereby the marine organisms are arranged to be transported in the pipeline due to its specific weight and/or by a liquid flow of the treatment liquid provided by the circulation pump.

6. Treatment system according to claim 1, wherein the first separator is placed higher than a liquid surface of the liquid bath, and the second separator is placed lower than, or at approximately the same height, as the liquid surface of the liquid bath.

7. Treatment system according to claim 1, wherein the pipeline, before the second separator, is tilted at an angle and directed upwards from the liquid bath, whereby the marine organisms are transported in the pipeline due to the liquid flow of the treatment liquid supplied by the circulation pump and by the stream of the marine organisms through the inlet.

8. Treatment system according to claim 1, wherein the container for collection of the treatment liquid comprises a heating element.

9. Treatment system according to claim 1,
wherein the container for collection of the treatment liquid comprises equipment for separation of, and collection of, separated lice.

10. Treatment system according to claim 1,
wherein the system comprises measuring devices and equipment for monitoring of temperature of the treatment liquid and also the amount of liquid circulating in the system.

11. Treatment system according to claim 1, wherein the container for collection of the treatment liquid is arranged to receive heated water.

12. Method for a lice treatment system for marine organisms, where the marine organisms are brought through a liquid bath with treatment liquid,
said method comprising the steps:
continuously feeding marine organisms from the outside and through an inlet, said inlet being an inlet for marine organisms that shall be treated,
separating the marine organisms and water,
bringing the marine organisms through a pipeline and a closed liquid bath with a U-shape filled with the treatment liquid for removal of lice, said liquid bath having respective liquid surfaces,
separating the treatment liquid from the marine organisms before being released out through an outlet, and
continuously pumping the treatment liquid back to the pipeline and the closed liquid bath and mixing it with marine organisms that are brought in through the inlet.

13. Method according to claim 12,
wherein the treatment liquid is lukewarm water with a temperature of about 30° C., and wherein the water which is separated is caught in a container and heated up to the desired temperature before it is pumped back.

14. Method according to claim 12,
wherein the treatment liquid is water to which chemicals for lice treatment are added, and wherein the separated water is caught in a container.

15. Method according to claim 14,
wherein chemical are separated from the collected water in the container, to prevent a discharge to the sea.

16. Method according to claim 12,
wherein exposure time for the marine organisms in the liquid bath is dependent on the height and volume of the liquid bath and also the rate of flow.

17. Method according to claim 12,
wherein exposure time of the marine organisms in the liquid bath is about 30 seconds.

* * * * *